(12) United States Patent
Jorgensen et al.

(10) Patent No.: US 6,602,413 B2
(45) Date of Patent: Aug. 5, 2003

(54) SEALED CENTRIFUGAL CLARIFIER

(75) Inventors: Glen Jorgensen, Marlboro, MA (US); William F. Aitkenhead, Sharon, MA (US); Joseph D. Antocci, Leominster, MA (US)

(73) Assignee: MEDIcept, Inc., Ashland, MA (US)

( * ) Notice: Subject to any disclaimer, the term of this patent is extended or adjusted under 35 U.S.C. 154(b) by 0 days.

(21) Appl. No.: 09/832,525

(22) Filed: Apr. 11, 2001

(65) Prior Publication Data

US 2002/0020679 A1 Feb. 21, 2002

Related U.S. Application Data

(60) Provisional application No. 60/196,193, filed on Apr. 11, 2000.

(51) Int. Cl.[7] .............................. B04B 7/02; B01D 21/26
(52) U.S. Cl. .................... 210/295; 210/304; 210/380.1; 494/36
(58) Field of Search ................ 210/360.1, 380.1, 210/295, 304; 494/36, 43, 60, 17, 41

(56) References Cited

U.S. PATENT DOCUMENTS

| | | | |
|---|---|---|---|
| 3,785,549 A | 1/1974 | Latham, Jr. | |
| 4,098,456 A | * 7/1978 | Bayham | 494/17 |
| 4,502,954 A | 3/1985 | Druffel | |
| 4,767,396 A | 8/1988 | Powers | |
| 4,983,158 A | * 1/1991 | Headley | 494/41 |

OTHER PUBLICATIONS

PCT Search Report, Jul. 17, 2001.

* cited by examiner

Primary Examiner—David A. Reifsnyder
(74) Attorney, Agent, or Firm—Edwards & Angell, LLP; George W. Neuner; Lisa Swiszcz Hazzard

(57) ABSTRACT

A sealed centrifugal clarifier with a pre-sterilized and disposable container which lines the separation chamber is disclosed. More particularly, the centrifugal clarifier contains a feed port that allows a liquid-solid mixture to be continuously fed into the device wherein the solid is sedimented by rotation of the separation chamber and the clarified liquid is released into an outside receptacle through an effluent port. The throughput rate of the clarifier is adjustable and can be determined as a function of the fill radius of the separation chamber.

41 Claims, 8 Drawing Sheets

SEALED CENTRIFUGAL CLARIFIER

The present application claims the benefit of U.S. provisional application No. 60/196,193, filed on Apr. 11, 2000, incorporated herein by reference in its entirety.

FIELD OF THE INVENTION

The present invention relates to an apparatus and method for the large-scale separation of a liquid from a solid that is dispersed therein on a continuous basis. More particularly, the apparatus and method provide a high-speed, centrifugal clarifier that contains a central, coaxial membrane surface that allows separation of a solid material irrespective of size and density from a liquid in a sterile environment, without the need for costly sterilization procedures, by use of a pre-sterilized disposable separation chamber.

BACKGROUND OF THE INVENTION

Centrifugal clarifiers are well known devices for separating solids from a liquid-solid mixture and are used in a wide variety of applications such as separating sludge from oil and for harvesting cells from nutrient media in a biopharmaceutical fermentor. Biopharmaceutical manufacturing and research facilities use fermentors to produce high-density cultures of cells producing a useful product. The first step in recovering and purifying the product is separation of the cellular mass from the suspending growth media. The progression of the cultures are monitored for byproducts of cell growth in the media such as sucrose and carbon dioxide concentrations. Once the amounts of these substances reach a certain level, it indicates that the cells have stopped growing and should be harvested immediately or the cells may begin to die and release intracellular contaminants (endotoxins) upon further exposure to such conditions that begin to contaminate the product and further accelerate the rate of decline.

A high degree of sterility must be maintained in both the fermentor and the centrifugal clarifier. Introduction of contaminants could lead to damage or loss of the product and could prevent reuse of the potentially valuable cells.

The most commonly used clarification apparati are cross-flow membrane filtration devices, and large-volume, continuous flow centrifuges. For "extra-cellular" products (proteins that are secreted by the viable cell) filtration is generally used. Current filtration methodologies suffer from continual plugging of the membrane pores. As more and more cell-free filtrate is removed, the concentration of the retentate increases. This must be recirculated continuously at high velocities to prolong the time before the membrane fouls, or plugs; the concentration can never get so high as to avoid losing as much as 10% of the product in the fluid entrained in this recirculating stream. In addition to product loss, this high-shear cross flow to clear the membrane can result in product loss due to contamination, degradation, equipment fouling, and high shear-force-induced cell lysis. These events can cause downstream fouling of expensive purification equipment and processes, ultimately resulting in product loss or contamination. Finally, this technology suffers from the high cost of assuring the sterility of the apparatus through validation of clean-in-place or steam-in-place purification procedures of the product-contact surfaces by quality assurance organizations.

For "intra-cellular" products, the cells must first be lysed, or split open, by some mechanical means such as sonication, or by some chemical or enzyme that causes the cell wall to rupture, thereby releasing the product. Centrifuges are then used to separate the cellular debris from the suspending media containing the product. Unfortunately, the sludge-like sediment cakes onto the centrifuge surfaces and must later be manually scraped loose and collected for disposal. Furthermore, since the centrifuges are not sealed, the noise and aerosols that are created require that they be positioned within special enclosures. The aerosols can be hazardous. In addition, the supernatant from the centrifuge is often run through a secondary filter to remove contaminates that were too light to sediment and that may decrease the column life in the subsequent downstream processing steps.

Centrifuge equipment, like filtration, requires significant capital expenditures because they must also be designed to withstand the clean-in-place and steam-in-place procedures necessary to sterilize that step of the process. Extensive validation is required assure sterility. This validation requires a specialized staff that is expensive to train and maintain.

The decision between centrifuge and filtration is further complicated by the need to accurately predict clarification performance as the manufacturing scale of the process is increased. This process is carried out in several successively increasing scales. The cell strain is first perfected in "lab-scale" fermenters that range in size from 10 to 100 liters. Then production experiments are run on "pilot-scale" fermentors that range in size, based on the cell strain involved, but are usually limited to 1,000 liters. After the initial production is shown to have produced clinically successful product, the process is scaled up to the long-term, "production-scale" fermenters which generally range from 10,000 to 100,000 liters. As the fermenter size is scaled up, it is critical that each step in the downstream process can also be scaled up with predictable results.

What is needed is an apparatus and method for separating a liquid from a solid dispersed therein which is scaleable and easy to use. What is further needed is a method and apparatus that eliminates the need for expensive sterility and validation procedures for clarification equipment used for harvesting cells from a fermentor.

See also: Tenthoff U.S. Pat. No. 4,411,645; Inge et al. U.S. Pat. No. 5,024,648; and Inge et al. U.S. Pat. No. 5,720,705.

SUMMARY OF THE INVENTIONS

The present invention provides a method and apparatus for separating a liquid from a solid dispersed therein.

More particularly the present invention provides a centrifugal clarifier that can incorporate a coaxial polishing filter and a method for separating a liquid from a liquid-solid mixture by rotation of a separation chamber. Further, the separation is carried out in a pre-sterilized and disposable container thus eliminating the need for clean-in-place or steam-in-place equipment, processes and validation. Still further, the present invention allows for the continuous introduction of a mixture into the centrifugal clarifier through a feed port and expulsion of clarified liquid into an outside container through an effluent port.

In the first embodiment, the centrifugal clarifier contains a cylindrical separation chamber that is covered by a lid with a hole therethrough. The chamber contains a pre-sterilized and disposable container that provides a sealed, sterile environment inside the clarifier. The lid of the disposable container fits into and is secured by the annular lid of the separation chamber and contains ports therethrough which allow introduction to and discharge from the separation chamber under sterile conditions. The disposable lid further contains a rotating face seal that provides a junction between the rotating and non-rotating components of the lid without leakage of aerosols or liquids. The seal faces are configured such that a sterile fluid can circulate through the seal to cool and lubricate the faces for high speed operation while insuring the sterility of the processing fluids.

A liquid-solid mixture is introduced through a feed port in the disposable lid and is carried to the bottom of the separation chamber through a feed tube. The particulate matter present in the mixture is sedimented to the walls of the chamber starting with the radially most outward and bottom position through rotation of the chamber, e.g., by an electric motor. The clarified liquid is then expelled into an outside container through an effluent port in the lid of the disposable container.

In a second embodiment, separation efficiency is enhanced by adding a coaxial filter within the disposable chamber such that the clarified liquid leaving through the effluent port is first passed through a membrane core. The membrane core is configured so as to prevent the smallest expected particle in the liquid-solid mixture from passing through the membrane while still allowing passage of the liquid. The membrane core rotates with the rotating chamber to minimize the relative rotational movement between the fluid (which is rotating at aproximately the same speed as the rotating chamber) and the membrane core. This eliminate any significant shear forces at the membrane surface which might lyse certain delicate cells such as mammalian cells. The synergy of combining centrifugation and filtration in series allows the centrifugal field that surrounds the membrane to be used as a coarse, pre-filtration clarification step that minimizes the cellular load impinging upon the membrane by sedimenting the particles radially away from the surface of the membrane. In turn, the membrane polishes the supernatant to a purity level that the centrifuge alone is incapable of achieving. The membrane is positioned in a manner that causes the cell-free, centrifugal supernatant to flow through the membrane material before exiting the centrifugal chamber, thus filtering out the floating or "foaming" contaminants.

In a third embodiment, the membrane core is fixed and does not rotate. This presents significant shear forces at the membrane surface as the fluid, which is rotating at high speeds, approaches the membrane surface. This shear can be valuable tool in keeping the membrane clear when separating the more robust cellular material, such as yeast cells, which tend to stick to the membrane surface. In addition, since the lower seal has been eliminated, higher feed pressures can be used.

In another embodiment of the invention, the filter used in either the second or third embodiment above is designed to remove bacterial and viral contaminates from the product and, as such, is preferably a 0.2 micron membrane. This includes those contaminates that have been environmentally introduced by a flaw in the pre-sterilization procedures, or, more importantly, the larger intracellular viral contaminates that have been secreted during the fermentation process.

The throughput rate of a liquid-solid mixture into the centrifugal clarifier is adjustable over time as a function of the fill radius of the separation chamber. As solid material begins to accumulate in the separation chamber, the radius of the chamber will decrease and the throughput rate of the feed must consequently decrease. An appropriate throughput rate for the centrifugal clarifier can be determined mathematically.

Solid material collected in the pre-sterilized and disposable container may be stored in said container for use at a later time. Alternatively, the solid material may be resuspended in fresh liquid and pumped out through the feed port for immediate reuse.

The centrifugal clarifier of the invention is exemplary used as a first step of purification for products produced in a fermentor. It is envisioned that two devices will be required: A lab-scale clarifier for fermentors from 10 to 1,000 liters and one for full production scale of fermentors greater than 1,000 liters. The mechanical effects of separation on the cells and the throughput rates are mathematically determined and reliably accurate as the process is scaled up from "lab-scale" fermenters that range in size from 10 to 100 liters to the long-term "production-scale" fermenters which generally range from 10,000 to 100,000 liters. As the fermenter size is scaled up, it is critical that each step in the downstream process can also be scaled up with predictable results, including the clarifier. Multiple clarifiers may be used in parallel to harvest the contents of fermentors larger than 1,000 liters. The size is ultimately limited to the size of the container of packed cells that must be easily removed from the clarifier. A 1,000 liter fermenter was arbitrarily selected as somewhere near the largest device. It typically yields 100 to 200 liters of packed cells weighing between 100–200 kilograms. This compares roughly with the size and weight of a standard 55-gallon drum, which is commonly used for the transport of materials in the pharma manufacturing facility. This can be handled conveniently by a davit affixed to the clarifier and by standard drum movers between the clarifier and the destination point.

It is envisioned that processing larger fermentors can be accomplished by running multiple clarifiers in parallel. Each positioned such that a common davit can remove the container of packed cells.

The clarifier is generally configured so as to be compact and portable, but the overall dimensions may vary depending on the particular application. Preferably it is mounted on swivel casters for extreme mobility. The structural elements of the clarifier are preferably constructed of common high-strength metals such as, e.g., aluminum, stainless steel, or composite materials.

Other aspects of the invention are discussed infra.

BRIEF DESCRIPTION OF THE DRAWINGS

For a fuller understanding of the nature and desired objects of the present invention, reference is made to the following detailed description taken in conjunction with accompanying drawing figures wherein like reference character denote corresponding parts throughout the several views wherein.

DETAILED DESCRIPTION OF THE INVENTION

Figure 1:
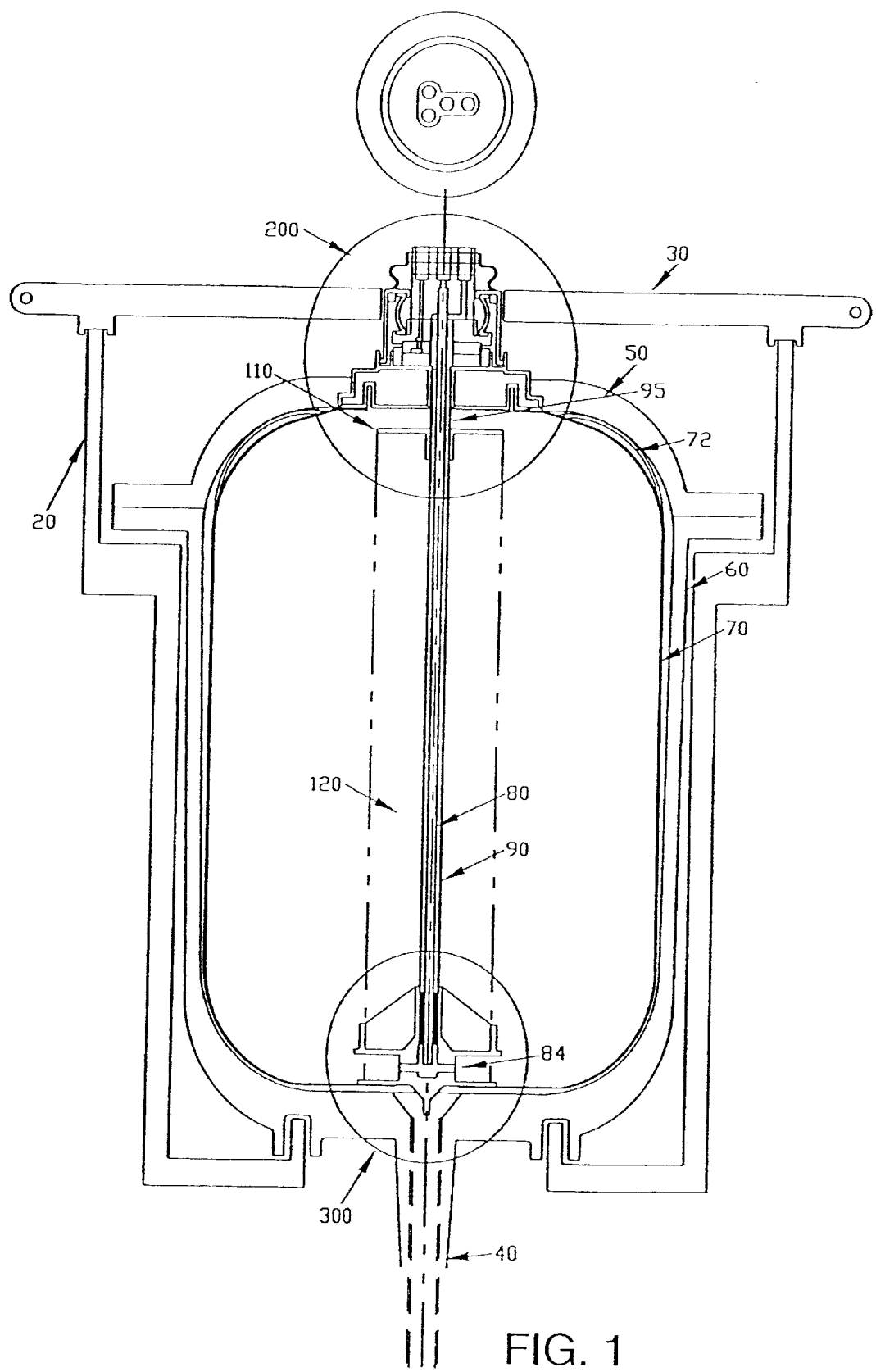
FIG. 1 shows an axial section through a part of a centrifugal clarifier of the invention that does not contain a membrane core.

Referring now to the various figures of the drawing wherein like reference characters refer to like parts, there is shown in FIGS. 1–4 various views of a centrifugal clarifier 10 in accordance with the invention.

In one embodiment of the present invention, the centrifugal clarifier 10 comprises a cylindrical separation chamber 60 and an annular lid 50. The separation chamber 60 is secured to the drive motor of a centrifuge and the lid 50 is removably secured to the separation chamber 60. The separation chamber 60 is secured into a centrifuge by inserting a screw 40 attached to the bottom of the separation chamber 60 into an appropriate adapter located in the drive motor. However, it is to be understood that this is not a limitation and the separation chamber 60 can be attached to a centrifuge motor by any means that provides sufficiently stable fastening such as snaps, clips, etc. Likewise, the annular lid 50 can be secured to the separation chamber 60 by a variety of methods. A preferred method is to have the annular lid 50 hingedly connected to the separation chamber 60, but any other means that provides sufficiently stable fastening can be used.

The separation chamber 60 is rotated in a predetermined direction by a centrifuge motor around the longitudinal axis so as to separate a liquid from a solid suspended therein due to centrifugal force. Rotation of the separation chamber causes the liquid or liquid-solid mixture to fill the chamber from the radially most outward bottom portion to the topmost center portion of the separation chamber 60. Rotation of the liquid body causes particulate matter suspended within the liquid, and having a higher density than the liquid, to sediment radially outwards and the clarified liquid to flow radially upwards.

The centrifugal clarifier 10 is configured so that the separation chamber 60 can contain a disposable and sterile container 70. The disposable container 70 is sealed to a disposable lid 200 to create a sealed sterile environment within the separation chamber 60. The disposable lid 200 is configured so as to fit into and be secured by the annular lid 50 of the separation chamber. The disposable lid 200 comprises a feed port 82 and an effluent port 92. The feed port 82 is capable of passing liquid or a liquid-solid mixture from an outside source, through the lid 200, into the disposable container 70. The effluent port 92 is capable of passing liquid from the disposable container 70, through the lid 200, into an outside receptacle. The lid 200 is configured such that introduction of substances into and out of the disposable container 70 may be carried out under sterile conditions.

In a particularly preferred embodiment, the disposable container 70 is a sterile disposable bag preferably fabricated of a flexible or semi-rigid material. The bag balloons out under centrifugal force to conform to the walls of the separation chamber 60. The bag is preferably made out of plastic, but may be made out of any substance that is capable of maintaining a sealed and sterile environment such as rubber, cloth, etc. The bag preferably also contain handles 72 on the side facing the lid 50 so as to ease removal of the bag from the separation chamber 60. The bag is sealed to the disposable lid 200 so as to maintain a sterile sealed environment within the separation chamber. The entire sealed unit, including the bag and the lid, is disposable.

The disposable lid 200 is configured so that the base of the lid 270 is a rotating seal housing which is sealed to the top of the disposable container 70. The rotating seal housing 270 fits into and is held in place by the annular lid 50 of the separation chamber 60. A rotating face seal 240, 250 is connected to the top of the rotating seal housing. The rotating face seal is a perfect seal wherein the face of one seal 250 is composed of carbon and the adjoining face of the other seal 240 is composed of ceramic. The rotating face seal provides a junction between rotating and non-rotating parts of the disposable lid wherein no leakage of aerosols or fluids occurs between the two seal members 240, 250. The rotating face seal 240, 250 is secured by an alignment ring 260 which keeps the face seal aligned and maintains the concentricity of the feed tube 80 and effluent tube 90. The upper half of the rotating face seal 240 is secured to a seal support 230. The lid also contains non-rotating feed 82 and effluent 92 ports. The feed port 82 is connected to a feed tube 80 that also is stationary. The stationary effluent port 92 is connected to a rotating effluent tube 90. The effluent tube 90 is connected to the rotating seal housing 270 with the junction 94 between the rotating effluent tube and the non-rotating effluent port occurring at the top of the rotating seal housing. Another seal 220 is positioned at the top of the disposable lid 200 to prevent airborne environmental contaminates from entering the sterile space surrounding the face seals 240, 250 and to apply the force necessary to insure good contact between the opposing faces of the rotating seal.

In a preferred embodiment, the feed port 82 is connected to a feed tube 80 which runs longitudinally through the center of the separation chamber so as to carry liquid or a liquid-solid mixture from the disposable lid 200 to the bottom of the disposable container 70 and release it through a lower feed port 84. The feed tube 80 is located concentrically within a second tube that is connected to the effluent port 92. The effluent tube 90 has effluent ports cut through the wall of the tube and positioned so that liquid from the separation chamber 60 can pass through the wall of the tube and be carried from the separation chamber to the effluent port 92 in the disposable lid 200.

More particularly, a backflow cylindrical seal 310 circumferentially encompasses the feed tube 80 and seals the space between the feed tube and the effluent tube 90. The backflow seal 310 prevents material entering through the feed tube 80 from mixing with clarified material exiting though the effluent tube 90. Alternatively, a face seal also can be used.

In an exemplary embodiment, a flat disk, or head skirt 110, is connected to and circumferentially encompasses, the effluent tube 90. The head skirt 110 is located slightly below the lid 50 and extends out from the effluent tube 90 into the separation chamber 60 a short distance. An air bubble 120 is trapped below the head skirt 110 and extends longitudinally along the length of the effluent tube to the bottom of the disposable container 70. The air bubble 120 prevents feed material from entering the space where the centrifugal force might be insufficient to sediment cells.

Figure 2:
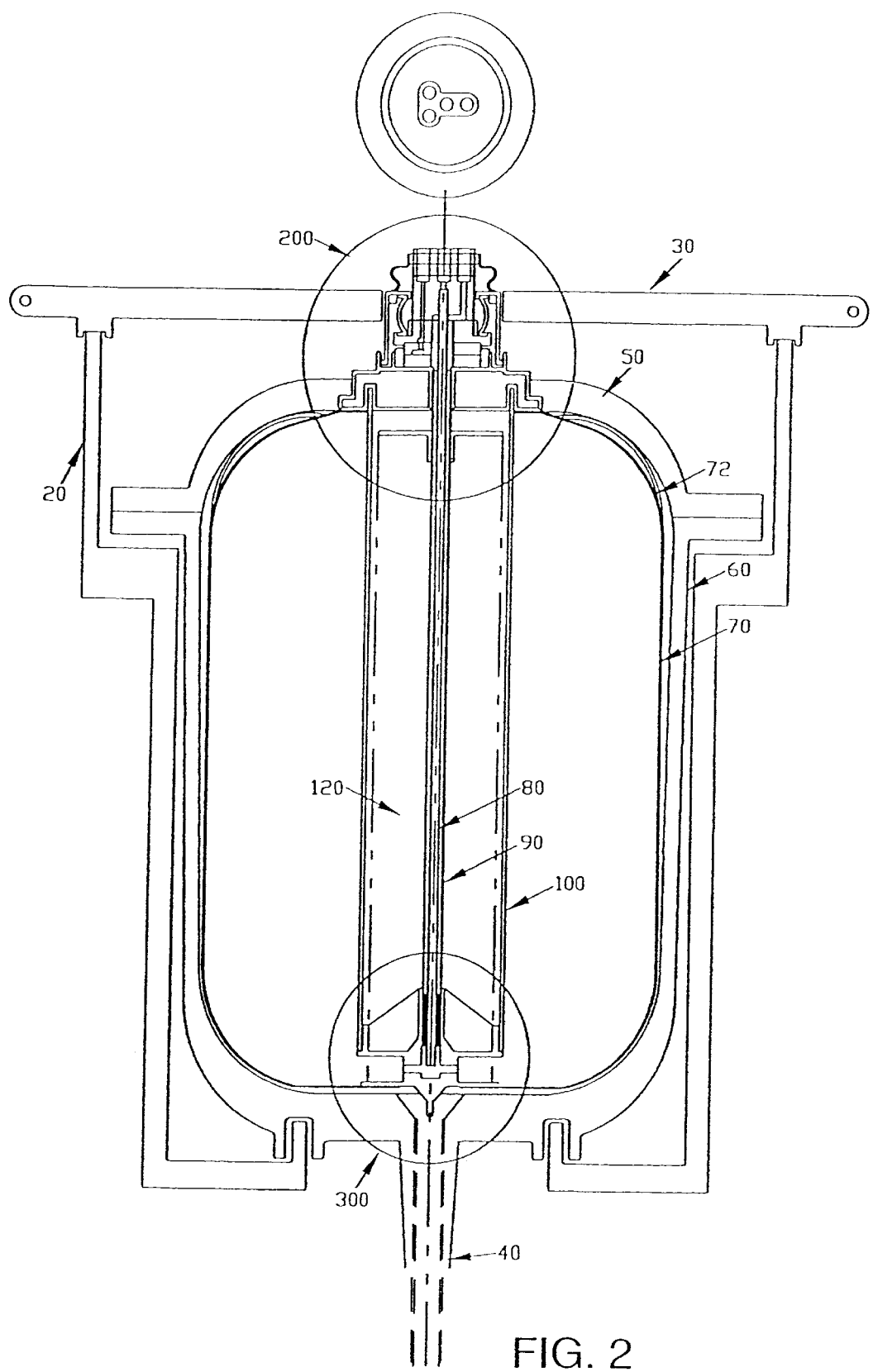
FIG. 2 shows an axial section through a part of a centrifugal clarifier of the invention that contains a rotating membrane core.

In a second embodiment, as shown in FIG. 2, the feed and effluent tubes 80, 90 are located concentrically within a membrane core 100. The membrane core 100 extends longitudinally from the lid 200 of the disposable container 70 where it is secured by the rotating seal housing 270 to a membrane core support 320 that is located just above the lower feed port 84. The membrane core 100 rotates with the rotating chamber defined by 50 and 60. The head skirt 110 and air bubble 120 are enclosed within the membrane core 100. The pore dimensions of the membrane core are chosen to be of a size such that the smallest particle in the liquid-solid mixture is unable to pass through the membrane while still allowing the liquid to pass through the membrane.

Figure 5:
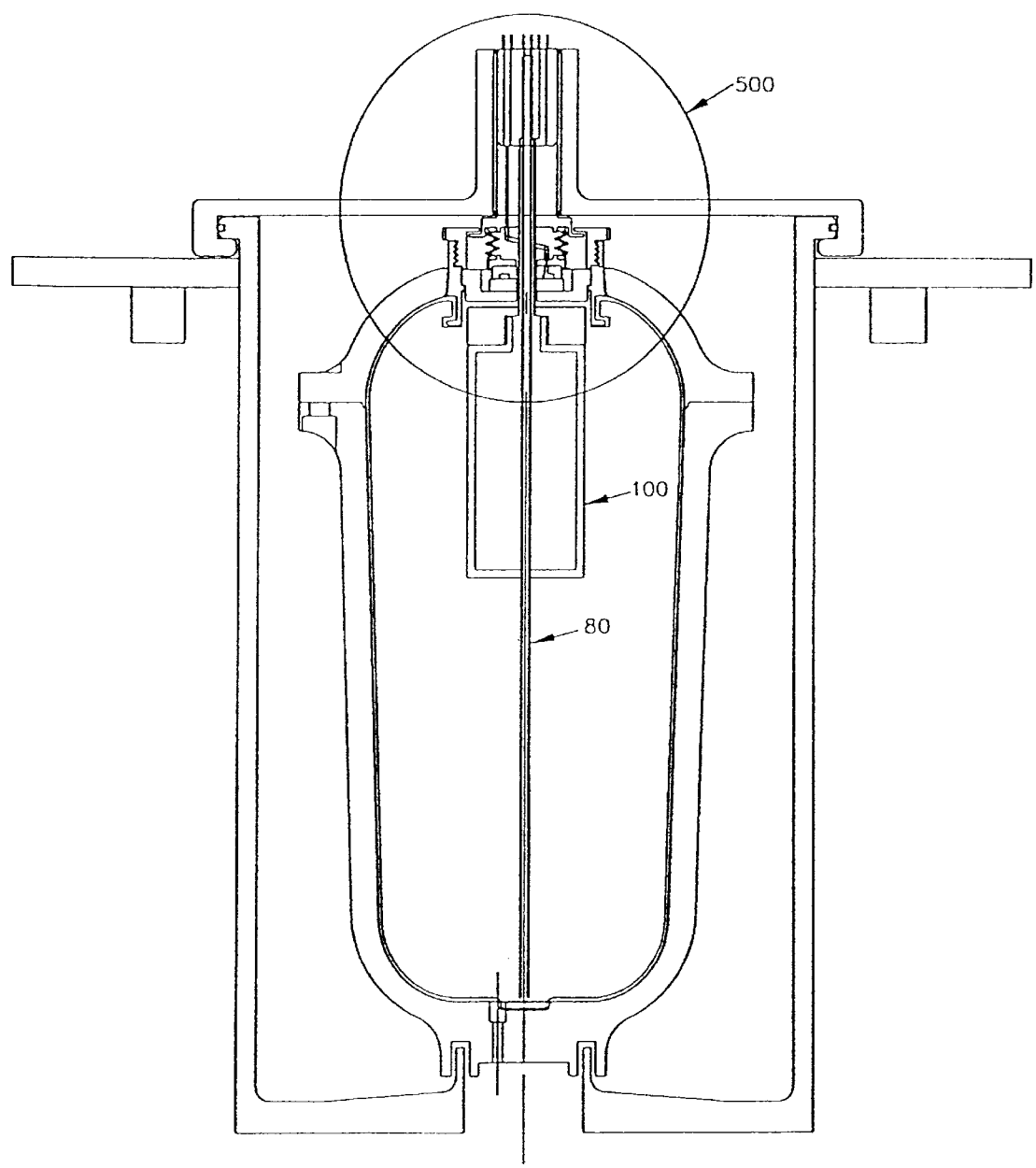
FIG. 5 shows an axial cross-section through a part of the clarifier type with a fixed membrane core.
Figure 6:
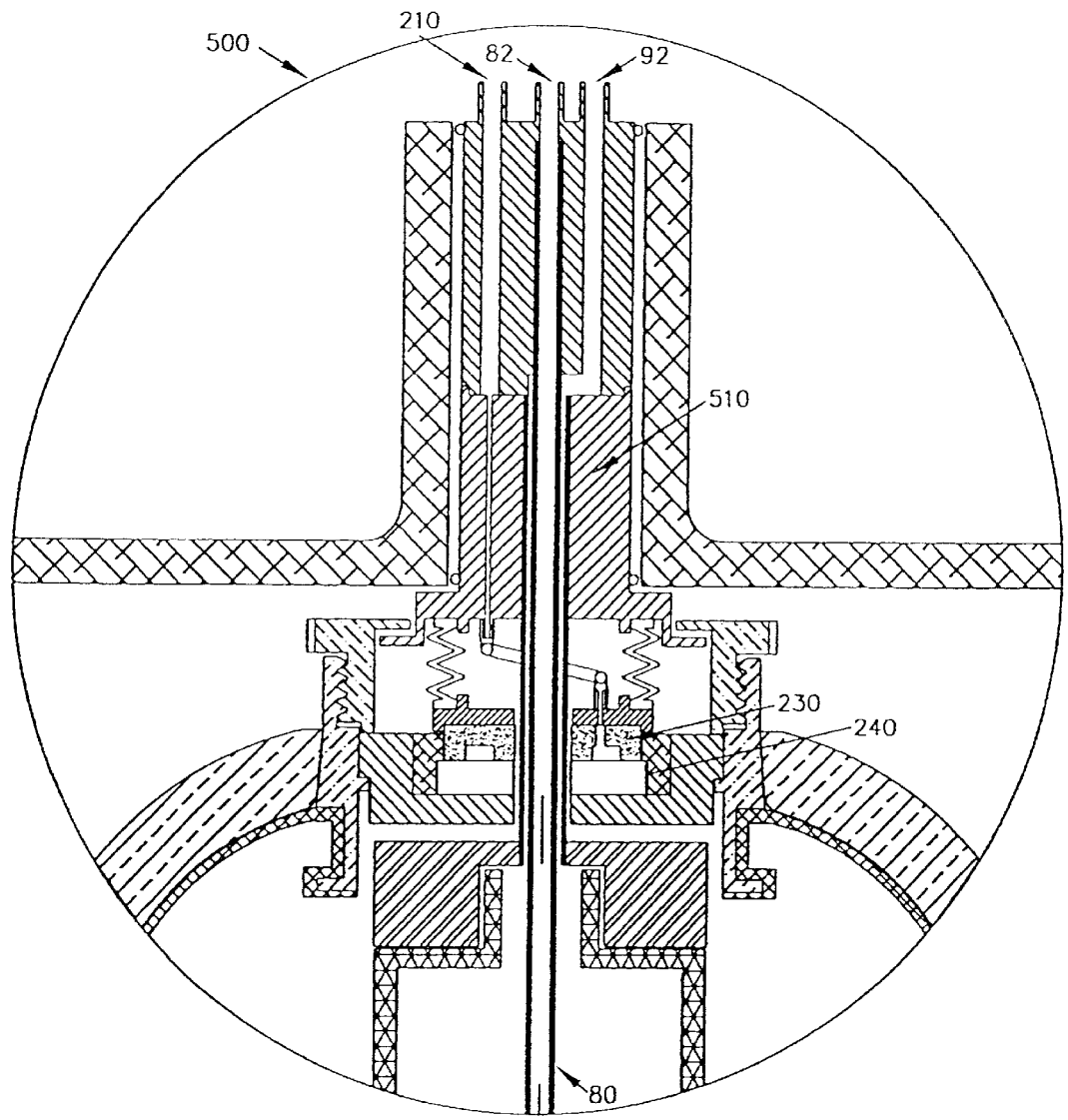
FIG. 6 shows an enlarged view of the rotating seal details of item 500 from FIG. 5.

In a third embodiment, for example, as shown in FIG. 5, the membrane core 100 (which is variable in length depending on the application), is fixed to the non-rotating upper support 510. This fixes the position of both the membrane core 100 and the central feed tube 80 and holds them stationary as the rotating chamber 50/60 spins co-axially around them.

Not shown in the figures, a pressure gauge is positioned downstream of effluent port 92 that serves to monitor the pressure inside the separation chamber 60.

Figure 3:
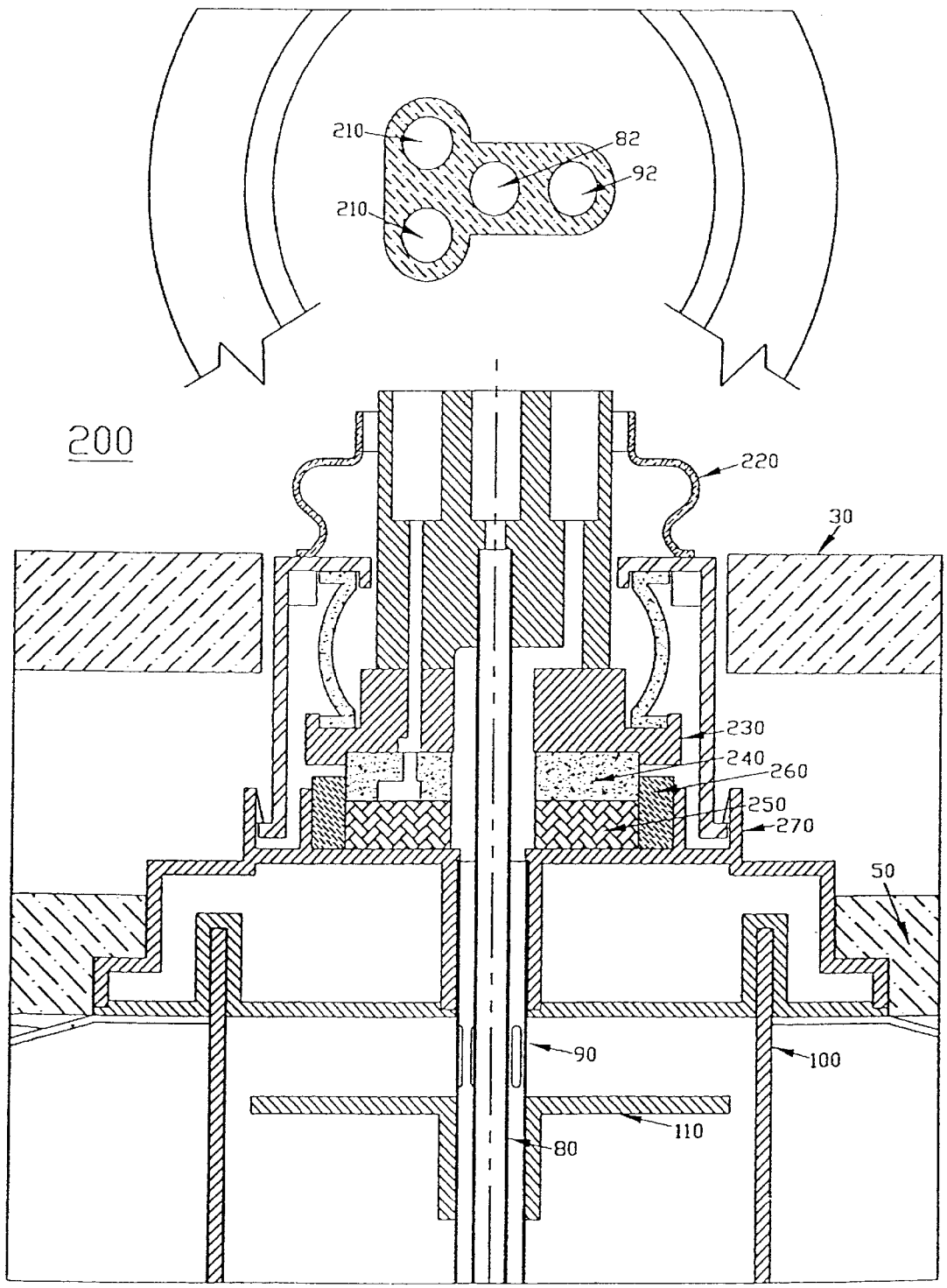
FIG. 3 shows an exploded view of 200 from FIG. 2.
Figure 4:
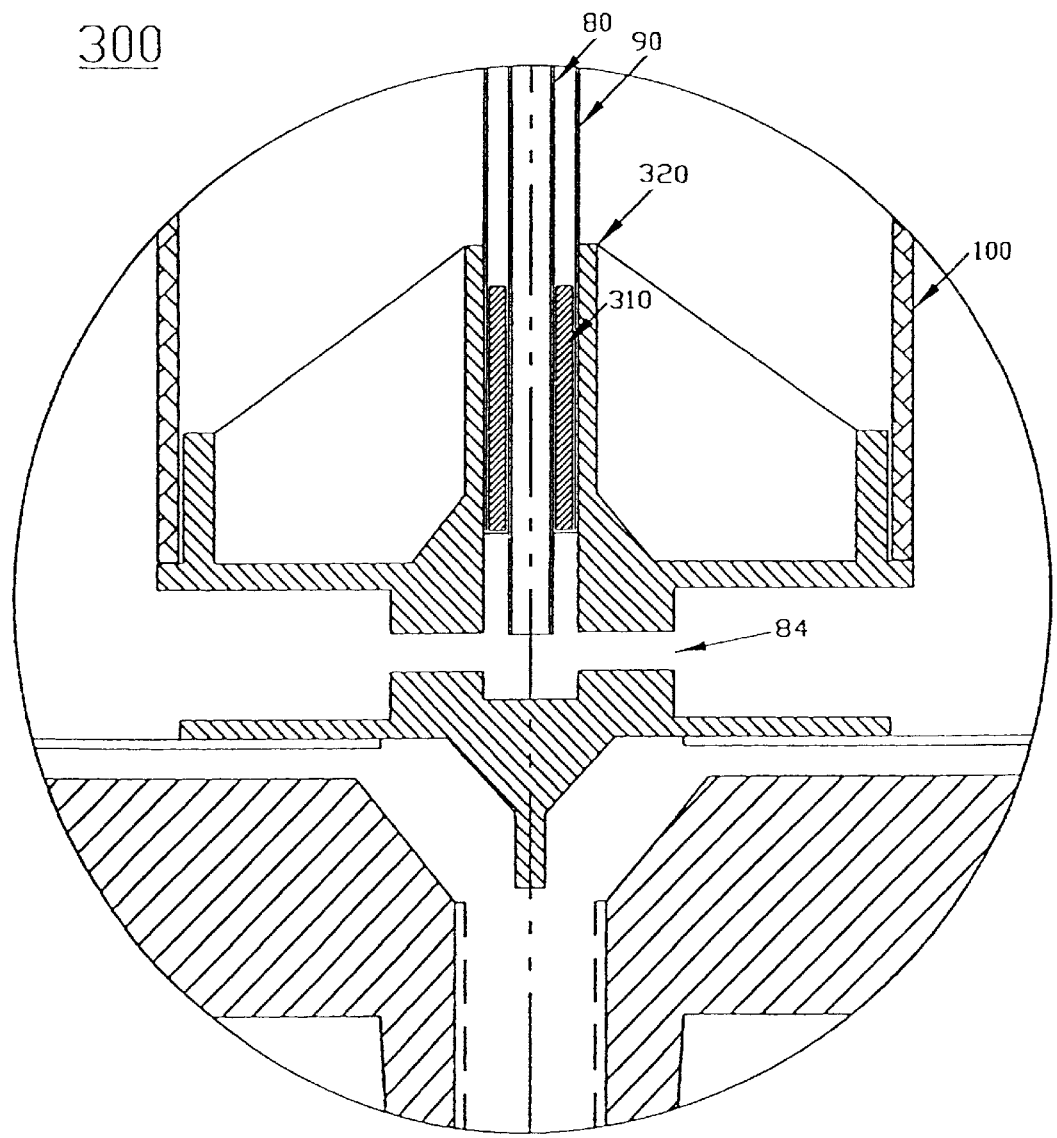
FIG. 4 shows an exploded view of 300 from FIG. 2.

As shown in FIG. 3, the disposable lid 200 may further comprise one or more port 210. In one embodiment, a single port is located in the disposable lid 200 to supply pressurized sterile air into an annular shaped passage inscribed in the non-rotating seal. In the unlikely event that the seal faces begin to leak, then the pressurized sterile air prevents contaminants from entering the sterile space. In some embodiments, for example, for higher speed applications, the single port can be replaced with a double port 210 comprising an inlet and outlet port, as shown in FIG. 3, that allows sterile fluid to be circulated through the annular passage for the purpose of absorbing heat from the seal faces and lubricating the seal faces.

In a specific embodiment, the centrifugal clarifier 10 is attached to a microprocessor that allows the user to monitor the progress of the purification and the conditions, such as pressure, within the separation chamber 60. Additionally, the microprocessor can be programmed so as to control such things as throughput speed, the destination of material expelled through the effluent port 92, etc.

The spinning separation chamber 60 can be enclosed within a stationary bucket 20 that is sealed with a stationary lid 30. The stationary lid 30 of the bucket 20 contains a hole therethrough to accommodate the disposable lid 200 of the sterile container 70 and allow access to the feed and effluent ports, etc.

The centrifugal clarifier can vary in dimension depending on the application. Particularly preferred is a compact and mobile unit that can be supported, for example, on swivel casters for extreme mobility for laboratory scale applications. Larger sizes would require a fixed mounting configuration. The walls and lid of the separation chamber 60, 50 and the walls and lid of the encompassing bucket 20, 30 can be composed of any common structural metal such as, e.g., high-strength aluminum alloy, stainless steel alloy, or composite materials.

In an exemplary embodiment, the centrifugal clarifier is configured so as to harvest the contents of a fermentor. The growth media and cell mixture is fed into the clarifier through the feed port 82 and the clarified growth media is expelled into an outside container through the effluent port 92. The cells sediment through rotation of the separation chamber 60 and accumulate in the sterile container 70, starting at the radially most outward bottom portion of the container 70 and moving to the topmost center part of the container 70. When the container 70 is almost completely full of cells, exit of liquid through the effluent port 92 will be blocked since very little liquid will be able to gain access to the effluent tube 90. The pressure inside the separation chamber will jump dramatically since the volume of fluid exiting the chamber will not correspond to the amount of fluid entering the chamber. Thus, the pressure gauge that is in line with port 92 can signal when the separation chamber is full.

Since the container 70 lining the separation chamber is sterile, cells collected inside the container 70 may be reused. The cells can be stored in the sterile container 70 after removal from the separation chamber for use at a later time.

Alternatively, fresh growth media may be added through the feed port to resuspend the cells and the resuspended cells may then be pumped back into the fermentor through the lower feed port 84, into the feed tube 80 and out through the upper feed port 82.

In a specific embodiment, the centrifugal clarifier is configured so that the separation chamber is able to contain 10 liters of cells or other solid material. However, this is not meant to be a limitation and a separation chamber that is capable of containing more or less than 10 liters of material may be used.

For harvesting a fermentor that has a capacity of greater than 10 liters of cells, two or more centrifugal clarifiers can be used in parallel. For example, when the first clarifier is full, i.e. has collected approximately 10 liters of packed cells, the output line from the fermentor can be automatically switched to the feed port of a second centrifugal clarifier. While the second clarifier is harvesting cells from the fermentor, new growth media can be added to the first clarifier and the harvested cells resuspended and pumped into a different fermentor, or the disposable container 70 can be removed and replaced with a new, empty container. When the second clarifier is full, the output from the fermentor is switched back to the first clarifier while the second one is emptied, etc. until the fermentor is emptied.

For very large fermentors, it may be preferable to use a second, large-scale device with the capacity to hold approximately 200 liters of packed cells, which is roughly the equivalent of a 55-gallon drum. This is the product from approximately 1,000 liters of fermentor product. The strategy is the same as describe above, however, which is operate two or more centrifugal clarifiers in tandem, one to be emptied and reloaded with a new disposable container 70 while the other is running.

The throughput speed of the liquid-solid mixture into the centrifugal clarifier is not fixed and can be adjusted as a function of the fill radius of the separation chamber. As sedimented solid material begins to fill the separation chamber, the radius of the chamber will begin to decrease, and consequently the g force exerted on the particles in the mixture decreases. Thus, the throughput speed of the liquid-solid mixture decreases as a function of the decrease in the fill radius of the chamber.

The throughput of the device can be determined by mathematically equating the sedimentation time, $t_{sed}$, which is the time it takes the target particle to sediment from the internal diameter of the chamber to the cell mass interface, with the residence time, $t_{res}$, which is the time it takes for the target particle to flow from the lower feed port at the bottom of the centrifugal chamber to the effluent port located at the top of the chamber. Thus, $t_{sed}=t_{res}$, where:

$$T_{sed}=[(18\mu)ln(r_f/r_i)] \div \Omega^2 \Delta\rho\, D^2$$

wherein $\mu$=dynamic viscosity of the suspending fluid (gm/s-cm)

$r_f$=final radius=radius of the packed cell interface (cm)

$r_i$=initial radius=radius of the air interface (cm)

$\Omega^2$=centrifugal speed (rad/sec)

$\Delta\rho$=difference between the density of the cell and the density of the suspending fluid (gm/cc)

D=cell diameter (cm)

$$T_{res}=L\pi(r_f^2-r_i^2) \div Q$$

wherein L=height of the separation chamber (cm)

Q=volume flow rate (mL/second) Solving for Q:

$$Q < [L\pi(r_f^2 - r_i^2)\Omega^2 \Delta\rho\ D^2] \div [(18\mu)ln(r_f/r_i)]$$

Thus, the target particles will have enough time to settle before being carried out of the separation chamber if the throughput rate of the liquid-solid mixture into the chamber is kept below the value calculated for the right side of the equation above.

Figure 7:
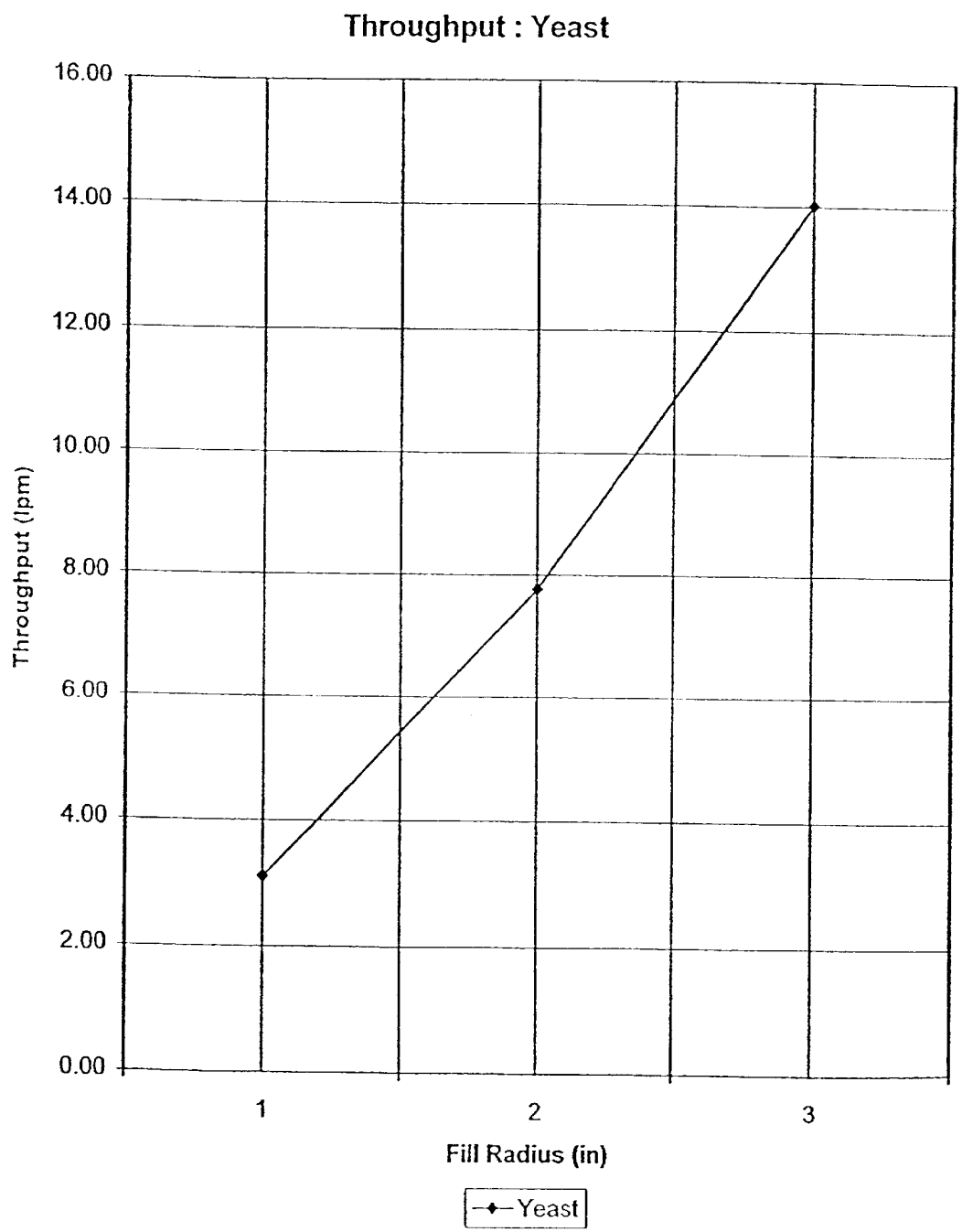
FIG. 7 shows a feed profile for yeast wherein the throughput (liter per minute) is plotted against the fill radius (inches) of the separation chamber.
Figure 8:
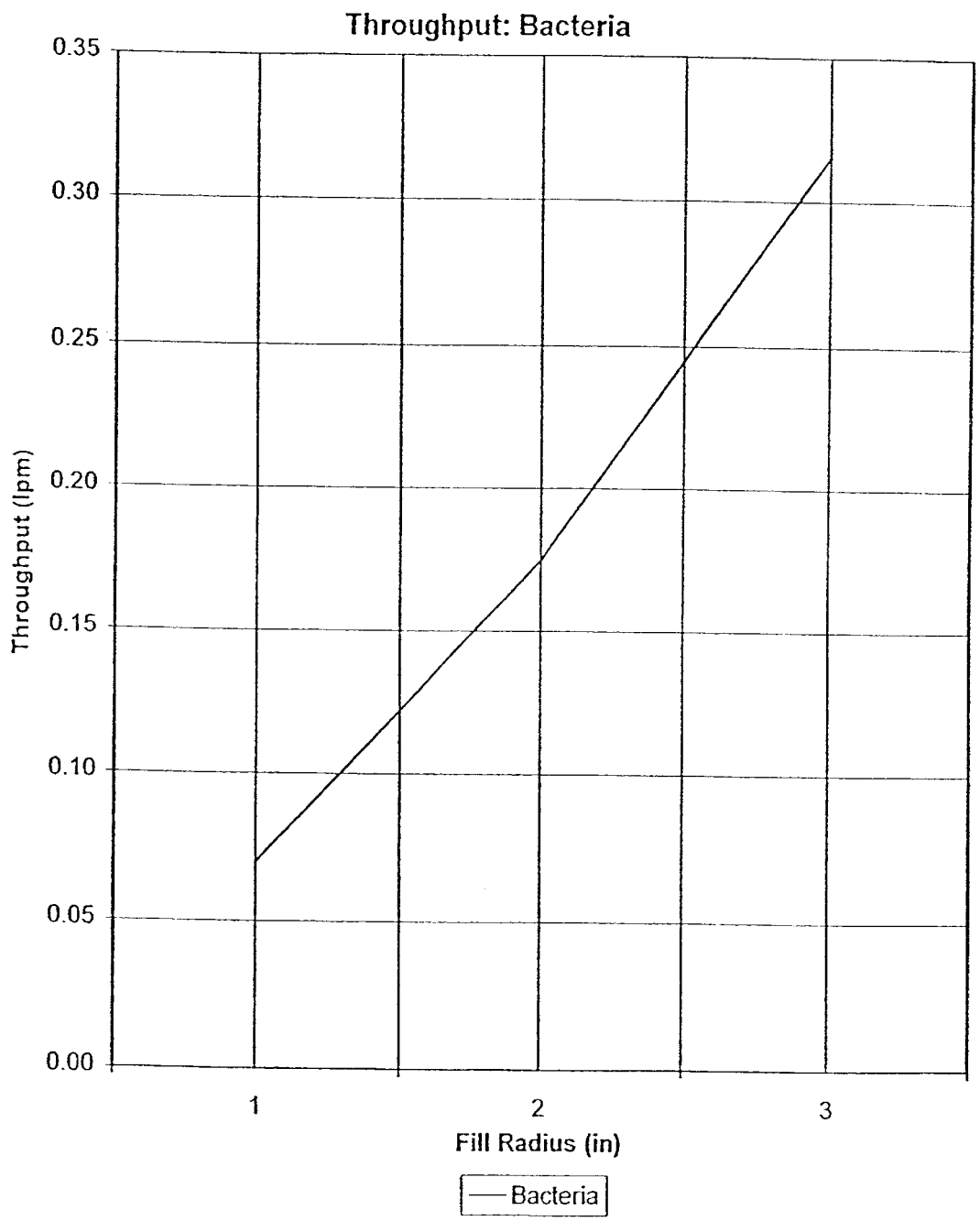
FIG. 8 shows a feed profile for bacteria wherein the throughput (liter per minute) is plotted against the fill radius (inches) of the separation chamber.

FIGS. 7 and 8 show feed profiles for yeast and bacteria. The feed profiles plot the throughput of the liquid-solid mixture into the chamber as liters per minute as compared to the fill radius of the separation chamber. The figures show that as the fill radius of the separation chamber decreases due to accumulating solid material, the throughput rate of the liquid-solid mixture also decreases. Additionally, it can be seen that the throughput rate for larger particles, e.g. yeast, is much higher than that for smaller particles, e.g. bacteria.

All documents mentioned herein are fully incorporated by reference. The foregoing description of the invention is merely illustrative thereof, and it is understood that variations and modifications can be effected without departing from the scope or spirit of the invention as set forth in the following claims.

What is claimed:

1. A centrifugal clarifier comprising:
   a cylindrical separation chamber that is attachable to a drive motor;
   an annular lid which attaches to the top of the separation chamber;
   a sterile, disposable container which fits into said separation chamber;
   a disposable lid which attaches to the top of the disposable container;
   a feed port which passes through the disposable lid and is capable of passing a liquid or a liquid-solid mixture from an outside source into the disposable chamber; and
   an effluent port which passes through the lid and is capable of passing a liquid from the disposable container into an outside receptacle;
   wherein the feed port is connected to a feed tube which runs along the longitudinal axis of the separation chamber and carries liquid or a liquid-solid mixture from the feed port to the disposable container and wherein the effluent port is connected to a effluent tube which runs along the longitudinal axis of the separation chamber and carries liquid from the disposable container to the effluent port;
   openings positioned in the wall of the effluent tube so that liquid from the disposable container may pass through the wall of the effluent tube into the interior space of the effluent tube;
   wherein the feed port and effluent port are structured and arranged to allow continuous flow into and out of the disposable container;
   wherein the liquid-solid mixture is fed into the disposable container through the feed port;
   wherein the separation chamber can spin around the longitudinal axis of the separation chamber so that the liquid-solid mixture fills the disposable container from the radially most outward bottom portion of the disposable container upwards and inwards to the topmost center portion of the disposable container;
   wherein the solid is separated from the liquid-solid mixture due to the centrifugal force of the rotating separation chamber until the disposable container is almost filled with the separated solid; and
   wherein the clarified liquid is released from the disposable container through the effluent port.

2. The centrifugal clarifier of claim 1, wherein the feed tube connected to the feed port is located concentrically within the second tube connected to the effluent port.

3. The centrifugal clarifier of claim 1,
   wherein the effluent tube is connected to a flat disk, located a short distance below the lid of the separation chamber, which circumferentially encompasses the effluent tube and extends perpendicularly from the tube for a short distance; and
   wherein an air bubble is trapped below the disk so that it circumferentially encompasses the effluent tube along the entire longitudinal axis between the disk and the bottom of the disposable container so that liquid leaving the disposable container though the effluent port is only able to pass through the wall of the effluent tube for the short distance between the top of the disk and the bottom of the lid of the disposable container.

4. The centrifugal clarifier of claim 1, wherein the tubes connected to the feed port and the effluent port are concentrically located within a cylindrical membrane core such that the liquid from the disposable container passes through the membrane core before passing through the openings in the wall of the effluent tube.

5. The centrifugal clarifier of claim 4, wherein the pores of the membrane core are of a size such that the smallest particle present in a liquid-solid mixture is unable to pass through the membrane core while the liquid is able to pass through the membrane core.

6. The centrifugal clarifier of claim 4, wherein the membrane core rotates with the separation chamber around the longitudinal axis of the separation chamber.

7. The centrifugal clarifier of claim 6, wherein the membrane core rotates at approximately the same speed as the separation chamber.

8. The centrifugal clarifier of claim 4, wherein the membrane core is fixed with respect to the rotating separation chamber.

9. The centrifugal clarifier of claim 1, wherein the sterile, disposable container is a flexible plastic bag that balloons out under centrifugal force to conform to the walls of the separation chamber or a semi-rigid material that maintains its shape outside the centrifuge but can deform slightly under the centrifugal force inside the centrifuge to contact the supporting top, bottom, and side surfaces of the rotating chamber.

10. The centrifugal clarifier of claim 1, wherein the disposable container has handles at the top for removal of the disposable container from the separation chamber.

11. The centrifugal clarifier of claim 1, wherein a backflow cylindrical seal is located between the tube connected to the feed port and the tube connected to the effluent port to prevent air from escaping through the bottom of the effluent tube and ensure that the liquid solid mixture entering the disposable container from the feed port is unable to mix with the clarified liquid exiting through the effluent port.

12. The centrifugal clarifier of claim 1, wherein a pressure gauge located in the effluent line monitors the pressure inside the separation chamber.

13. The centrifugal clarifier of claim 1, wherein the throughput speed of the liquid-solid mixture is a function of the fill radius of the separation chamber.

14. The centrifugal clarifier of claim 1, wherein operation of the device is controlled by a microprocessor.

15. The centrifugal clarifier of claim 1, wherein the throughput speed of the liquid-solid mixture changes from a range of about 0.60 to about 30.00 liters per minute at fill radius of about 4.0 inches to a range of about 0.05 to about 5.00 liters per minute at a fill radius of about 1.0 inches.

16. The centrifugal clarifier of claim 1, wherein the maximum capacity of the separation chamber is about 10 liters of solid material.

17. The centrifugal clarifier of claim 1, wherein the capacity of the separation chamber is greater than 10 liters of solid material.

18. The centrifugal clarifier of claim 1, wherein the rotating and non-rotating parts of the disposable lid are sealed with a rotating face seal.

19. The centrifugal clarifier of claim 1, wherein the sterile, disposable container fits into the separation chamber so that all surfaces are substantially in contact with the internal mating surfaces of the separation chamber and annular lid.

20. A centrifugal clarifier comprising:
a separation chamber attachable to a drive motor;
a lid mounted on the top of the separation chamber;
a sterile, disposable container which fits into said separation chamber;
a feed tube which passes into the disposable container and is capable of passing a liquid or a liquid-solid mixture from an outside source into the disposable container;
an effluent tube which passes into the disposable container and is capable of passing a liquid from the disposable container into an outside receptacle; and
a membrane core having the effluent tube and feed tube concentrically located therein, whereby liquid passed from the disposable container into the effluent tube first passes through the membrane core;
wherein the feed tube and effluent tube are structured and arranged to allow continuous flow into and out of the disposable container;
wherein the separation chamber can spin around the longitudinal axis of the separation chamber;
wherein components of the liquid or liquid-solid mixture fed into the disposable container are separated due to the centrifugal force of the rotating separation chamber;
wherein clarified liquid is released from the disposable container through the effluent tube.

21. The centrifugal clarifier of claim 20, wherein the feed tube runs along the longitudinal axis of the separation chamber and carries liquid or a liquid-solid mixture to the bottom of the disposable container and wherein the effluent tube runs along the longitudinal axis of the separation chamber and carries liquid out of the disposable container.

22. The centrifugal clarifier of claim 20, wherein feed tube is located concentrically within the effluent tube.

23. The centrifugal clarifier of claim 20 or 21, wherein the effluent tube has openings positioned so that liquid from the disposable container may pass through the wall of the effluent tube into the interior space of the effluent tube.

24. The centrifugal clarifier of claim 23 further comprising a mechanism that prevents the liquid or liquid-solid mixture fed into the disposable container through the feed tube from passing into the effluent tube before the components of the liquid or liquid-solid mixture are separated.

25. The centrifugal clarifier of claim 24, wherein the mechanism includes a backflow seal that seals the space between the feed tube and the effluent tube.

26. The centrifugal clarifier of claim 24, wherein the mechanism includes a disk located a distance below the lid of the separation chamber, which circumferentially encompasses the effluent tube and extends perpendicularly from the effluent tube; and
wherein an air bubble is trapped below the disk so that it circumferentially encompasses the effluent tube along the entire longitudinal axis between the disk and the bottom of the disposable container so that liquid leaving the disposable container though the effluent tube is only able to pass through the wall of the effluent tube for the short distance between the top of the disk and the top of the disposable container.

27. The centrifugal clarifier of claim 23 further comprising a mechanism that prevents the liquid or liquid-solid mixture fed into the disposable container through the feed tube from mixing with the separated components of the liquid or liquid-solid mixture.

28. The centrifugal clarifier of claim 27, wherein the mechanism includes backflow seal that seals the space between the feed tube and the effluent tube.

29. The centrifugal clarifier of claim 27, wherein the mechanism includes a disk located a distance below the lid of the separation chamber, which circumferentially encompasses the effluent tube and extends perpendicularly from the effluent tube; and
wherein an air bubble is trapped bellow the disk so that it circumferentially encompasses the effluent tube along the entire longitudinal axis between the disk and the bottom of the disposable container so that liquid leaving the disposable container through the effluent tube is only able to pass through the wall of the effluent tube for the short distance between the top of the disk and the top of the disposable container.

30. The centrifugal clarifier of claim 20, wherein the membrane core has pores sized such that the smallest particle present in a liquid or liquid-solid mixture is unable to pass through the membrane core while the liquid is able to pass through the membrane core.

31. The centrifugal clarifier of claim 20, wherein the membrane core rotates with the separation chamber around the longitudinal axis of the separation chamber.

32. The centrifugal clarifier of claim 31, wherein the membrane core rotates at approximately the same speed as the separation chamber.

33. The centrifugal clarifier of claim 20, wherein the membrane core is fixed with respect to the rotating separation chamber.

34. The centrifugal clarifier of claim 20, wherein the separation chamber spins around the longitudinal axis of the separation chamber so that the liquid or liquid-solid mixture fills the disposable container from the radially most outward bottom portion of the disposable container upwards and inwards to the topmost center portion of the disposable container 35. A centrifugal clarifier comprising:
a separation chamber attachable to a drive motor;
a lid mounted on the top of the separation chamber;
a sterile, disposable container which fits into said separation chamber;
a feed tube which passes into the disposable container and is capable of passing a liquid or a liquid-solid mixture from an outside source into the disposable container;
an effluent tube which passes into the disposable container and is capable of passing a liquid from the disposable container into an outside receptacle; and
openings positioned in the wall of the effluent tube so that liquid from the disposable container may pass through the wall of the effluent tube into the interior space of the effluent tube;

wherein the feed tube and effluent tube are structured and arranged to allow continuous flow into and out of the disposable container;

wherein the separation chamber can spin around the longitudinal axis of the separation chamber;

wherein components of the liquid or liquid-solid mixture fed into the disposable container are separated due to the centrifugal force of the rotating separation chamber;

wherein clarified liquid is released from the disposable container through the effluent tube.

36. The centrifugal clarifier of claim 35, wherein the feed tube runs along the longitudinal axis of the separation chamber and carries liquid or a liquid-solid mixture to the bottom of the disposable container and wherein the effluent tube runs along the longitudinal axis of the separation chamber and carries liquid out of the disposable container.

37. The centrifugal clarifier of claim 36, wherein feed tube is located concentrically within the effluent tube.

38. The centrifugal clarifier of claim 36 further comprising a mechanism that the liquid or liquid-solid mixture fed into the disposable container through the feed tube from passing into the effluent tube before the components of the liquid or liquid-solid mixture are separated.

39. The centrifugal clarifier of claim 36 further comprising a mechanism that prevents the liquid or liquid-solid mixture fed into the disposable container through the feed tube from mixing with the separated components of the liquid or liquid-solid mixture.

40. The centrifugal clarifier of claim 38 or 39, wherein the mechanism includes a backflow seal that seals the space between the feed tube and the effluent tube.

41. The centrifugal clarifier of claim 38 or 39, wherein the mechanism includes a disk located a distance below the lid of the separation chamber, which circumferentially encompasses the effluent tube and extends perpendicularly from the effluent tube; and wherein an air bubble is trapped below the disk so that it circumferentially encompasses the effluent tube along the entire longitudinal axis between the disk and the bottom of the disposable container so that liquid leaving the disposable container though the effluent tube is only able to pass through the wall of the effluent tube for the short distance between the top of the disk and the top of the disposable container.

* * * * *